(12) United States Patent
Mitchell et al.

(10) Patent No.: US 7,535,838 B1
(45) Date of Patent: May 19, 2009

(54) METHOD FOR DETERMINING RESOURCE USE IN A NETWORK

(75) Inventors: Julian Mitchell, Maidenhead (GB); Chris Simcoe, Dorney (GB)

(73) Assignee: Nortel Networks Limited, St. Laurent, Quebec (CA)

( * ) Notice: Subject to any disclaimer, the term of this patent is extended or adjusted under 35 U.S.C. 154(b) by 601 days.

(21) Appl. No.: 11/018,265

(22) Filed: Dec. 21, 2004

(51) Int. Cl.
*G01R 31/08* (2006.01)
(52) U.S. Cl. .................. 370/230; 370/389; 370/356; 370/475; 370/477
(58) Field of Classification Search ............... 370/389, 370/356, 475, 477, 229, 218, 248, 230
See application file for complete search history.

(56) References Cited

U.S. PATENT DOCUMENTS

| | | | |
|---|---|---|---|
| 4,736,363 A * | 4/1988 | Aubin et al. ................. | 370/400 |
| 7,035,259 B2 * | 4/2006 | Nomura et al. ............. | 370/392 |
| 7,257,081 B2 * | 8/2007 | Rajan et al. ................. | 370/231 |
| 7,346,056 B2 * | 3/2008 | Devi ........................... | 370/392 |
| 2006/0168317 A1 * | 7/2006 | Charzinski et al. .......... | 709/238 |

* cited by examiner

*Primary Examiner*—Ricky Ngo
*Assistant Examiner*—Kibrom T Hailu
(74) *Attorney, Agent, or Firm*—Barnes & Thornburg LLP

(57) ABSTRACT

A method for ascertaining the use of resources on a network having multiple paths across which data can pass. Each alternative path across the network is provided with a different address or port at a server or anchor point, such that, when a data packet is sent to a particular address it will travel across a certain path. As each path is associated with its own individual port or address a server can deduce from the port or address at which a data packet arrives which path it has traversed. The server can then use its knowledge of network topology and bandwidth availability to make policy enforcement decisions. These decisions may include whether to allow the call to proceed if the initial packet received is a call set up packet or, alternatively, a decision as to which path should be used for all transmissions from the terminal during the session.

18 Claims, 4 Drawing Sheets

METHOD FOR DETERMINING RESOURCE USE IN A NETWORK

FIELD OF THE INVENTION

This invention relates to discovering how a communications network's resources are being applied and more particularly using the resource knowledge to enforce policy decisions within the network.

BACKGROUND OF THE INVENTION

It is desirable to enforce policies in a network across which data is being sent in order to control transmissions across the network. For example a policy may give directions about how to enforce security requirements within the network. Another policy might be configured to use knowledge of the available bandwidth on connections throughout the network to perform admission control by deciding whether or not to permit calls which would use a certain connection according to the amount of available bandwidth. This allows a policy decision point to ensure that there is sufficient bandwidth to provision every call using a connection without impairing the quality of the transmissions.

When a network 10 is set out using a simple network topology such as a tree structure as illustrated in FIG. 1 data packets can only travel on one path between nodes on the network such as between a transmitter 12 and a receiver 14. In this type of network topology assumptions can be made about how the data is going to cross the network and, consequently, the amount of bandwidth which will be used on each particular connection. Policy decision points 16, such as a server, attached to the network can then enforce policies stored on the policy decision point 16 by applying the assumptions to the known network topology stored within it. The policy decision maker can then use this information to regulate the network 10, for example, to decide whether or not a request for transmission of data across the network 10 should be allowed or not.

In more complicated network topologies such as the one illustrated in FIG. 2, data may be able to travel down any one of two paths 18, 20 between nodes on the network such as between a transmitter 12 and a receiver 14. This means that assumptions which could be made with respect to a simple network topology cannot be made as it is not certain which of the paths 18, 20 the data will traverse to get from the transmitter 12 to the receiver 14. In these cases, or where there are more than two possible paths, the policy decision point 16 attached to the network 10 needs additional knowledge in order to make decisions about the provisioning of new and existing connections.

One possible solution to this is to gain additional knowledge about resource use within the network by placing intelligent middleboxes into the network. Each middlebox is enabled to monitor the status of individual paths within the network and report the status of these paths to the policy decision point. The policy decision point can then use this knowledge to apply its provisioning policy to the network.

Alternatively, the middleboxes may be configured to apply their knowledge of the flow of data through the network and any request for bandwidth to enforce policy itself. The use of middleboxes does, however, require extra hardware and software to be present within the network resulting in increased installation costs and maintenance of the network.

SUMMARY OF THE INVENTION

According to a first aspect of the invention there is provided a way of enforcing policy decisions on a network having multiple paths between a transmitter and receiver. The network is provided with a server having an address for each alternative path within the network down which data packets can travel between the transmitter and receiver.

A transmitter when sending a data packet across the network will attempt to send the data packet to each of the addresses provided by the server. According to the method of packet filtering implemented on the network the data packet will only be able to use one of the possible pathways to reach the server at any one time. According to the address at which the data packet arrives the server can determine which of the paths the data packet has taken.

The server can use this knowledge and the knowledge of how routing is being implemented on the network and the network topology to determine which path is going to be taken by all data packets in the transmission and enforce policies appropriately. For example, the server may determine that there is not enough available bandwidth to allow a connection without impairing the quality of other transmissions across the network and, therefore, deny the connection.

According to another aspect of the invention there is provided a method for enforcing policy decisions on a network having multiple paths between a transmitter and a receiver. The network is provided with a server having multiple addresses, each address being associated with a single path on which data packets between a transmitter and receiver can travel.

The server, on receiving a request for service, can provide the transmitter with an address to which all further data packets should be sent. In this way the server can decide how to distribute load across the network and whether to accept or deny a request for service according to the network resources being used.

Other aspects and features of the present invention will become apparent to those ordinarily skilled in the art upon review of the following description of specific embodiments of the invention in conjunction with the accompanying figures.

DETAILED DESCRIPTION OF PREFERRED EMBODIMENTS

Figure 1:
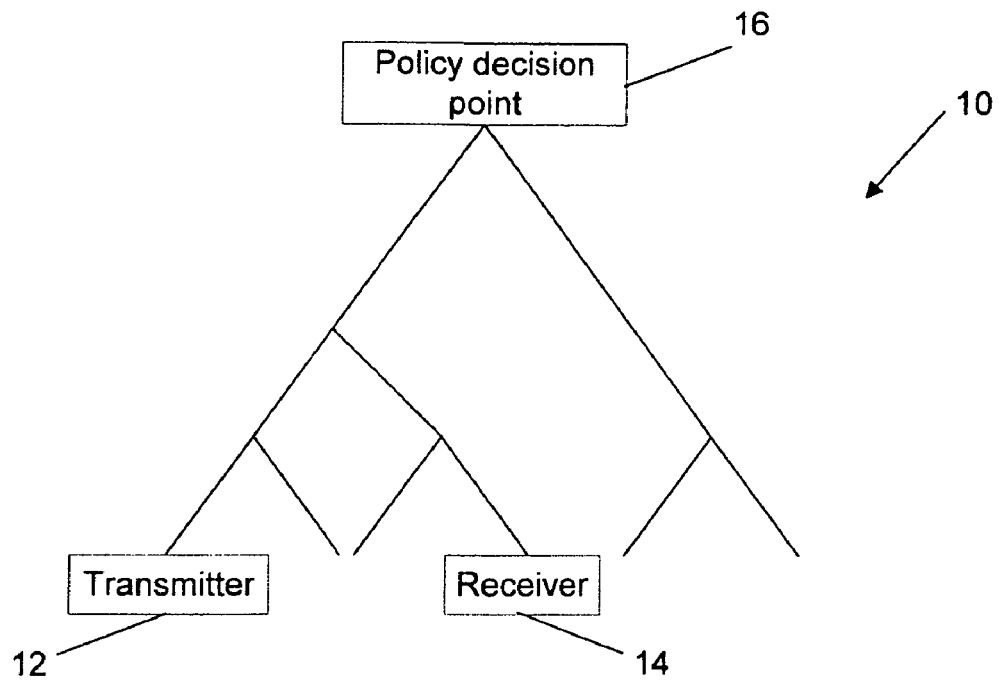
FIG. 1 illustrates a simple network topology.
Figure 2:
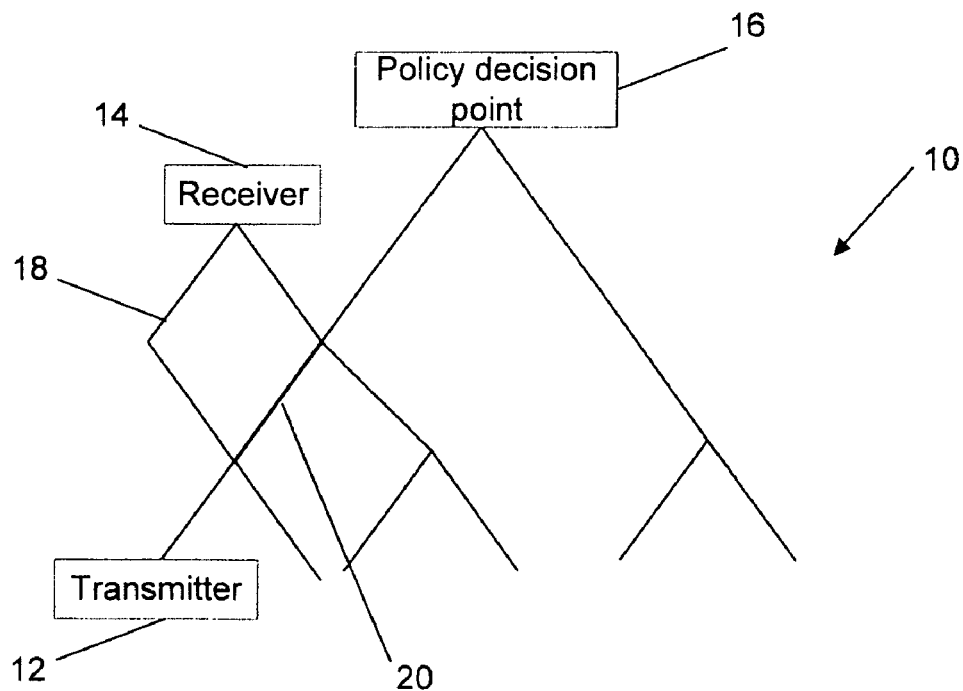
FIG. 2 illustrates a multi-path network topology.
Figure 3:
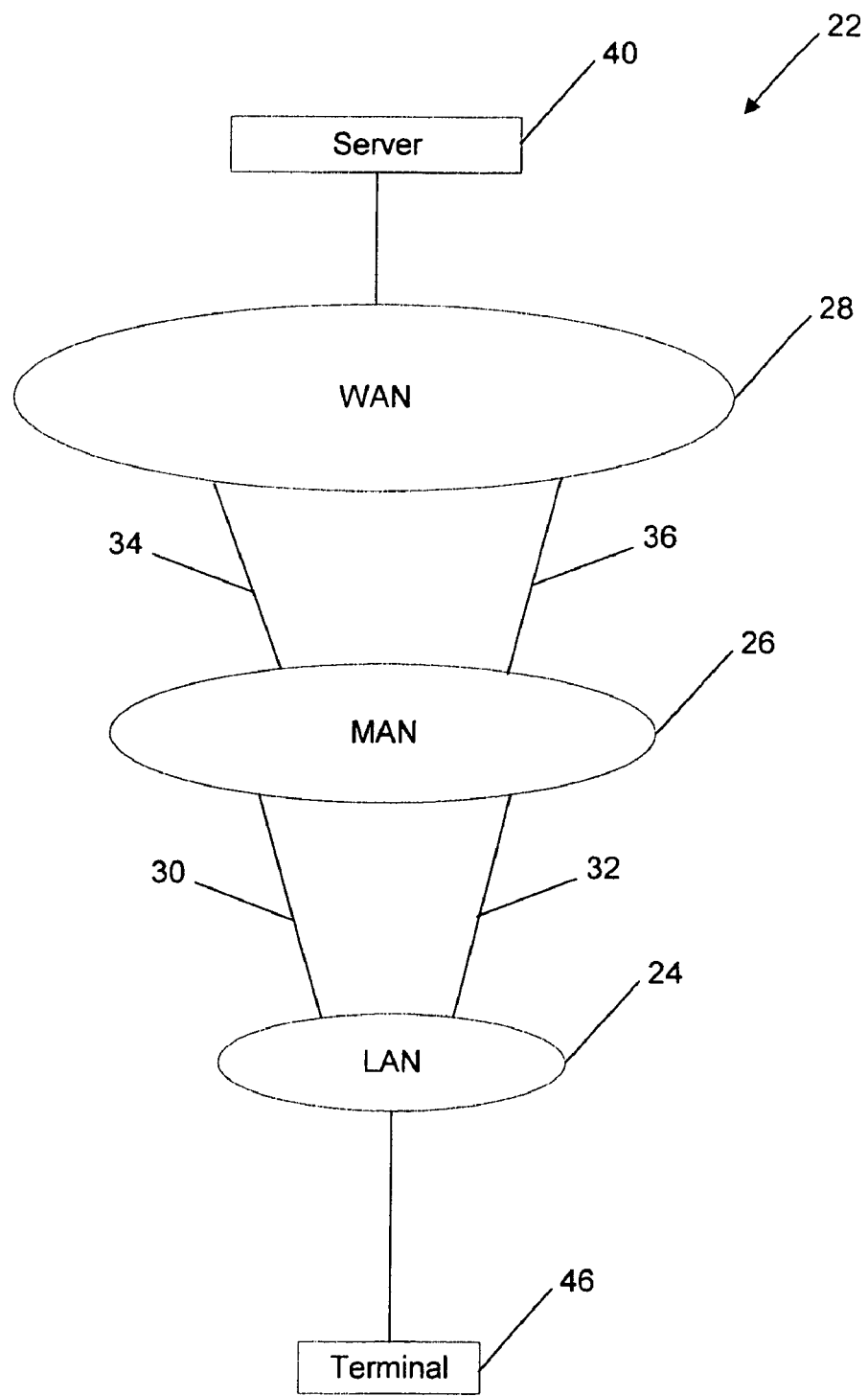
FIG. 3 illustrates a network having an active and back up path configuration.

FIG. 3 illustrates a communications network 22 comprising a Local Area Network (LAN) 24, Metropolitan Area Network (MAN) 26 and a Wide Area Network (WAN) 28. In this example the policy decision point, in this case the server 40, is concerned with enforcing network policy at policy enforcement points located in the LAN 24 and MAN 26. As can be seen the LAN 24 is connected to the MAN 26 by multiple connections, in this case 30 and 32 and likewise the MAN 26 is connected to the WAN 28 by multiple connections, 34 and 36.

Figure 4:
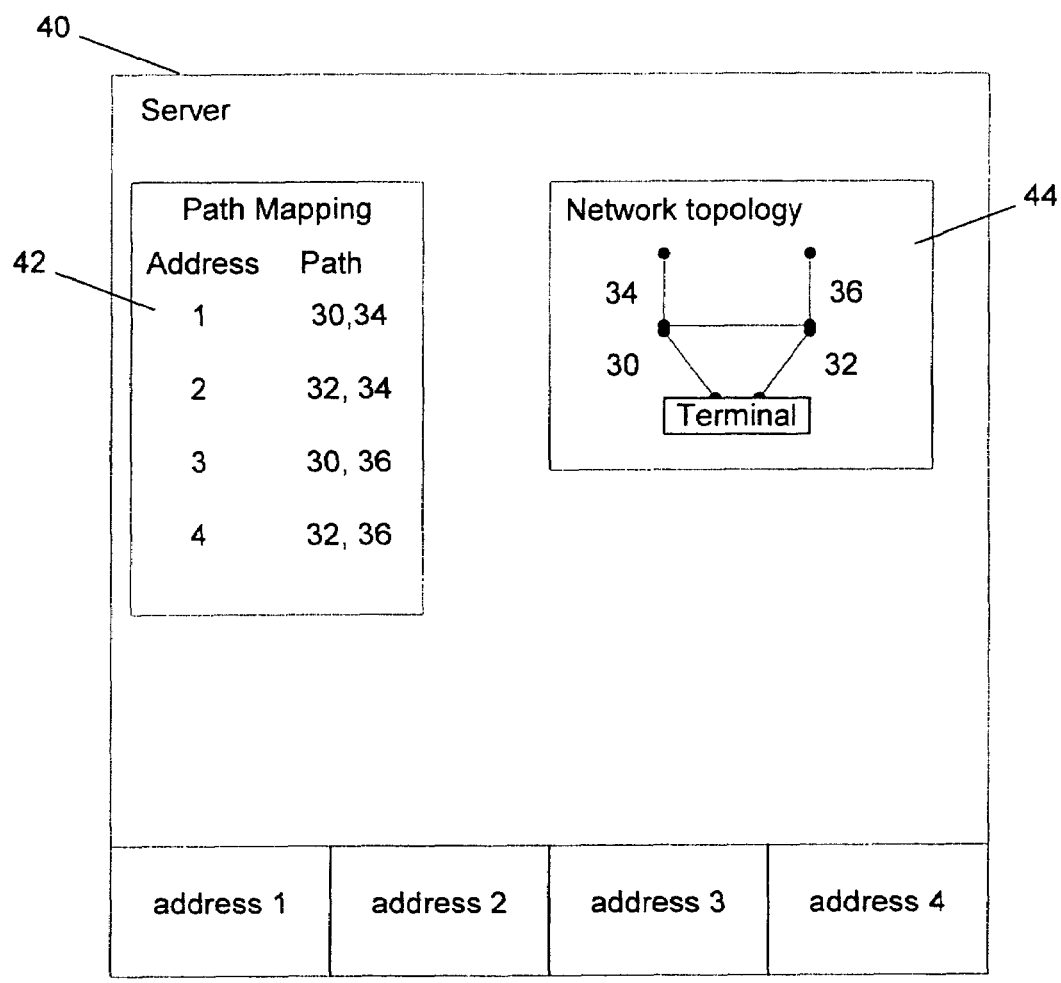
FIG. 4 illustrates a policy decision point.

The server 40 allocates each alternative path from the LAN 24 to the WAN 28, a separate address see table 42 in FIG. 4. The relationship between the address and the path is stored within the server 40 as shown in FIG. 4. Here it can be seen that address 1 corresponds to Path 30 followed by Path 34, address 2 corresponds to path 32 followed by path 34, address 3 corresponds to Path 30 followed by Path 36 and, finally, address 4 corresponds to Path 32 followed by Path 36. An address can be either an IP address or a port.

The server 40 also stores a representation 44 of the topology or the network. This is required in order that the policy can be appropriately chosen according to the topology and configuration of the network. The topology of the network may be automatically discovered from elements within the network or, alternatively, downloaded from an already existing database.

Referring back to FIG. 3, as previously discussed, the LAN 24 is connected to the MAN 26 by two connections. The network is set up such that one connection is always used to transmit data in preference to any other equivalent connection the preferred connection may be called the "active" connection and any other connections the "back-up" connection. The "back-up" connection may either take over carrying data if the "active" connection fails or, alternatively, a load balancing algorithm can be used such that all connections are "active" but a specific packet stream will take a particular connection. In FIG. 3 connections 32 and 34 are the active connections and 30 and 36 are the back-up connections.

When a terminal 46 such as a telephone or computer or a media gateway, adapted to relay data from a transmitter to a receiver, requests provision of a service by the network 22 i.e. a connection from the terminal 46 to the WAN 28 a service request will be sent to each of the server's addresses. The terminal 46 may send a service request to each of the addresses simultaneously. Alternatively, it may send a request to one address and then, if the request does not reach the server within a specified period of time, send a request to the next address, and so on until a service request is successfully transmitted to the server 40. The server 40 may determine which of these mechanisms is used to transmit the service requests.

If the network 22 is set up with a static packet filtering policy such that packets for a specific destination address of the server 40 will be prevented from traversing alternating connections, this will result in only some paths allowing certain packets through to a destination address. In this instance, the service request will be sent using any possible route but the network set up is such that only the packet sent using both active connections i.e. connections 32 and 34 and will arrive at the server, i.e. the packet addressed with address 2. The server 40 can then use the table stored on it to deduce from the fact that the service request arrived at address two that the data packet traveled across connections 32 and 34.

As the initial data packet traverses the currently active path from the terminal 46 to the WAN 28, it can be assumed that any following packets will travel along the same path as the initial data packet. The server 40 can use this knowledge that all data packets during one transmission will travel along the same path and apply it to the known network topology and availability of resources to decide whether to accept or deny the service request. The server 40 can also alter information stored on it so that any subsequent service requests can have policy enforced according to any altered resource availability.

If an active path in the network 22 changes, for example connection 32 fails leading to the data having to traverse connection 30 instead. Path 30 may have different capacity to path 32 as it is only a backup path and therefore, the provisioning policy will have to be altered accordingly. Any changes such as this will result in data being transmitted across a different path and arriving at a different address. This change in address will notify the server of the change in network configuration allowing it to alter its policies accordingly.

This method is equally applicable to networks having a single active path and more than one back up paths Not all networks have the active and back-up connection configuration described above. An alternative way to configure a network is to implement load balancing where data packets travel down paths according to load balancing algorithms on the paths. Hence in a network where load balancing is implemented it cannot be assumed that all data packets will take the same path as that of the service request unlike the set-up described above. Therefore, additional information is required to enforce any policy effectively on this type of network.

Figure 5:
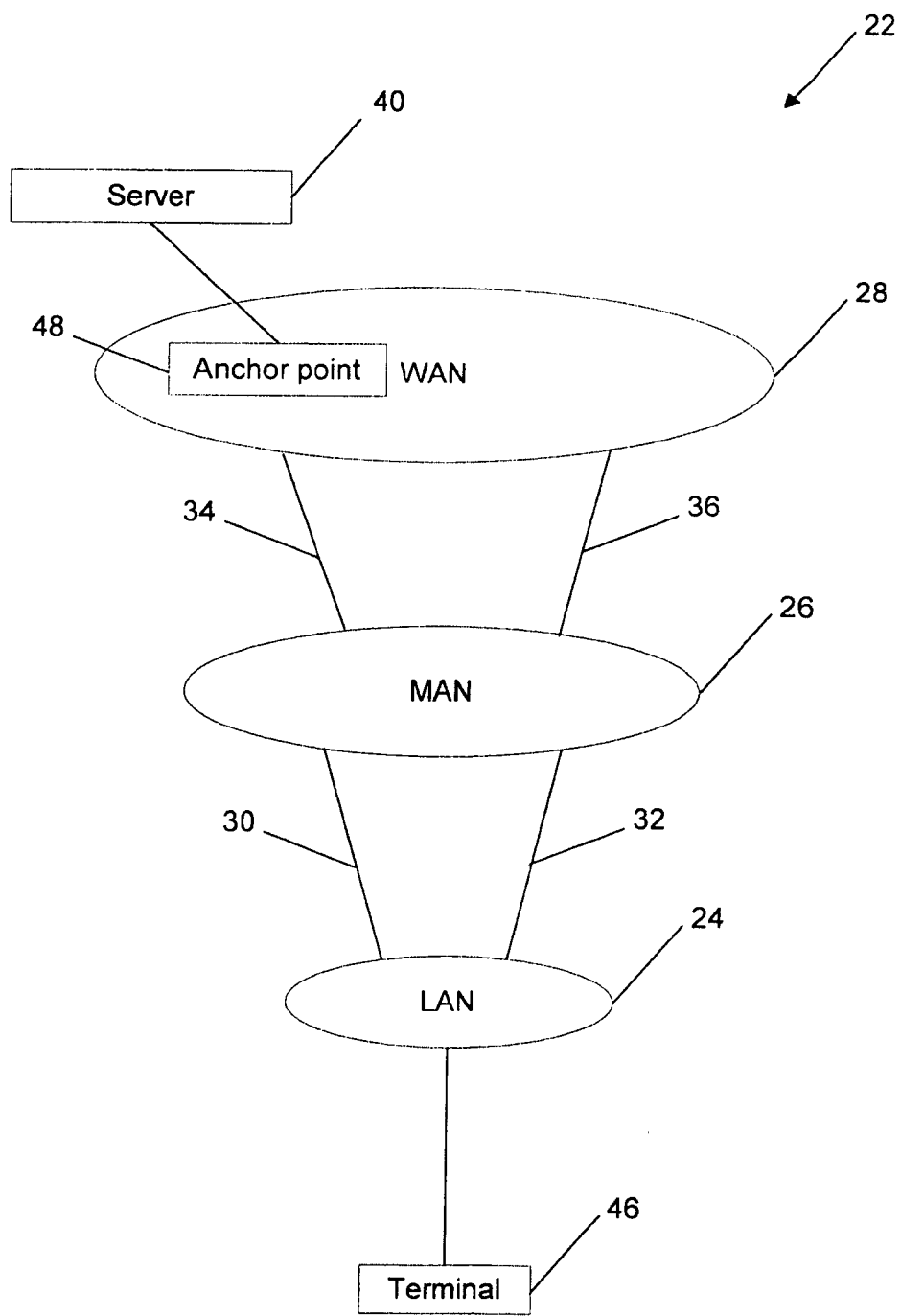
FIG. 5 illustrates a network having a server with an anchor point.

In order to implement policy across a network such as this an anchor point 48 is placed within the target network, for example the WAN 28 as illustrated in FIG. 5. An anchor point 48 is an interface on the network 22. It can be another endpoint to which the data is to be delivered or, alternatively, it could be a specific proxy inserted to perform a function such as determining the topology of the network 22. Typically, the function described below can be implemented on an existing anchor point or proxy.

FIG. 5 shows is a communications network 22 in which connections are configured as described above with path 32 being active and path 30 being a back-up. However, paths 34 and 36 are load-balanced, and statically set-up to selectively filter packets travelling to alternating addresses between network segments according to a pre-defined strategy. For example, they may be set up so that certain addresses are prevented from routing over each link consecutively in a so-called "round robin" strategy.

A terminal 46 connected to the LAN 24 is configured as before to send data packets to each of the addresses which have been allocated to the different paths attempting to set up a connection. The terminal 46 will send the data packets to the anchor point either simultaneously or in a pre-defined order as specified by the server 40.

According to the address at which the packet arrives at the anchor point the server 40 can deduce, with reference to the table stored on it, the path which the packet traversed. The server 40 can then use this information to make policy decisions such as whether to allow a subsequent request for transmission across the network 22 and to enforce this policy separately at the different enforcement points on the network.

An alternative method of enforcing policy on a network configured as illustrated in FIG. 5 is to allow the server 40 to decide which of the paths the transmission from the terminal 46 is to traverse and thereby enforce load-balancing on the network rather than allowing nodes on the network to enforce load balancing.

As described above, the anchor point 48 has more than one address for receiving data, each address corresponding to a certain pattern of paths along which the data travels. The server 40 has a topology map of the network 22, a knowledge of which paths are associated with which address and also knowledge about the amount of available resources available on the network 22.

A data packet from a terminal 46 such as the one illustrated in FIG. 5 can be received on any of the addresses of the anchor point 48. The server 40 will then take into account the topology of the network 22 and the available resources on the network 22 and select a path across which data from the terminal 46 is to be transmitted within that session. The address associated with the path is notified to the terminal 46 which then proceeds to send all data packets to that address. Hence, only the path selected by the server 40 is used for transmission of data across the network 22 by that terminal 46 during that session.

In this way the server 40 can control allocation of resources in a network 22 and decide how load balancing is applied across the network 22.

These methods can be used to handle even more complicated network topologies such as multiple layers of multiple-path networks.

What is claimed is:

1. A method of determining the use of resources on a meshed packet-switched network having multiple paths across which data can pass between first and second nodes, the meshed packet-switched network including at least one node including a representation of network topology, the method comprising the steps of:
    a) assigning, at the second node, a different address or port to each alternative path between the first and second nodes;
    b) receiving a data packet at an address or port of the second node;
    c) determining the address or port the data packet arrived at;
    d) determining the path taken by the data packet between the first and second nodes, wherein the path is determined from the address or port the data packet was received at and the representation of network topology; and
    e) determining a use of resources on the network from the path the data packet has been determined to have taken.

2. A method for determining the use of resources as claimed in claim 1 wherein said path between said nodes includes an intermediate node, each intermediate node being arranged to allow passage of packets destined for only one of said addresses.

3. A method for determining the use of resources as claimed in claim 1 comprising a further step of setting up the network such that said at least one node can determine the paths taken by subsequent packets sent between said first and second nodes.

4. A method for determining the use of resources as claimed in claim 1 wherein the network has an active and a back up path such that subsequent packets take the same path as a first packet transmitted between said first and second nodes.

5. A method for determining the use of resources as claimed in claim 1 comprising a further step of altering policy enforcement as a result of the data arriving at a different address to the address a preceding data packet arrived at.

6. A method for determining the use of resources as claimed in claim 1 wherein a one of the first and second nodes transmitting the data packet sends an initial data packet to each address.

7. A method for determining the use of resources as claimed in claim 1 wherein a one of the first and second nodes transmitting the data packet sends an initial data packet is sent to each address consecutively after failure of a preceding attempt to send said initial data packet to an address.

8. A method for determining the use of resources as claimed in claim 1 wherein one of said first and second nodes is said at least one node.

9. A method of performing admission control within a packet-switched communications network comprising a policy decision point, a first node and a second node, there being multiple paths between said nodes, the method comprising the steps of:
    (i) allocating an address, at said second node, to each path from said first node to said second node;
    (ii) transmitting a data packet from said first node to said second node;
    (iii) said second node receiving said data packet at one of said addresses;
    (iv) determining the path taken by the data packet from said first node to said second node, from the address said data packet was received at and a representation of network topology; and
    (v) said policy decision point performing admission control on said network according to said path determined to have been taken by said data packet.

10. A method of performing admission control as claimed in claim 9 wherein said enforcing policy decisions on said network includes accepting or denying further transmission of data packets across said path between said first node and said second node according to network topology and known bandwidth availability.

11. A method of performing admission control as claimed in claim 9 wherein packet filtering is implemented on said network allowing the policy decision point to predict bandwidth usage.

12. A method of performing admission control as claimed in claim 11 wherein said packet filtering is static packet filtering and results in the data packets transmitted during a session being selectively filtered such that each packet is sent over each path consecutively.

13. A policy decision point adapted to perform admission control in a communications network, the communications network comprising a first node and a second node, there being multiple paths between said nodes, said policy decision point comprising:
    (i) an input for receiving information from said second node, said second node being allocated an address for each path between said second node and said first node, the information including the address at which a data packet arrived at said second node;
    (ii) memory storing a representation of the topology of the network;
    (iii) a processor adapted to determine the path taken by said data packet between said first node and said second node, the path being determined with reference to the address at which it is received at said second node and the stored representation of the topology of the network; and
    (iv) an admission controller to perform admission control on said network according to said path determined to have been taken by said data packet.

14. A policy decision point as claimed in claim 13 further adapted to enforce policy decisions according to the path said data packet took to arrive at said node, the network topology, the networks packet filtering policy and availability of bandwidth on said network.

15. A policy decision point as claimed in claim 14 wherein said policy decision is call admission control.

16. A policy decision point as claimed in claim 15 further adapted to determine a path down which all further transmissions between a transmitting node and said node are to be sent.

17. A policy decision point as claimed in claim 16 wherein said policy decision point provides said node with an address which is to be used to send all further data packets to said node.

18. An IP network, comprising a first node, a plurality of intermediate nodes and a destination node, the network having a plurality of possible intermediate paths between the first and destination nodes via a respective one of said intermediate nodes, the destination node having a unique destination address or port for each respective intermediate path and each intermediate node being arranged to allow passage of packets destined for only one of said unique destination addresses, the IP network including at least one node including a representation of the topology of the network and configured to determine the path of a data packet according to the destination address or port on the destination node at which the packet is received, and the representation of the topology of the network and the use of resources on the network from the path of the data packet determined from the destination address or port.

* * * * *